United States Patent
Aboulnaga et al.

(10) Patent No.: US 8,140,490 B2
(45) Date of Patent: Mar. 20, 2012

(54) METHOD, SYSTEM AND PROGRAM FOR PRIORITIZING MAINTENANCE OF DATABASE TABLES

(75) Inventors: Ashraf Ismail Aboulnaga, Waterloo (CA); Peter Jay Haas, San Jose, CA (US); Sam Sampson Lightstone, Toronto (CA); Volker Gerhard Markl, San Jose, CA (US); Ivan Popivanov, Markham (CA); Vijayshankar Raman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 12/059,129

(22) Filed: Mar. 31, 2008

(65) Prior Publication Data

US 2008/0228831 A1    Sep. 18, 2008

Related U.S. Application Data

(63) Continuation of application No. 11/016,233, filed on Dec. 17, 2004, now Pat. No. 7,363,324.

(51) Int. Cl.
*G06F 17/30* (2006.01)
(52) U.S. Cl. ......... 707/690; 707/694; 707/700; 707/727
(58) Field of Classification Search ................... 707/200, 707/690, 694, 700, 727
See application file for complete search history.

(56) References Cited

U.S. PATENT DOCUMENTS

| | | | |
|---|---|---|---|
| 6,366,901 B1 * | 4/2002 | Ellis | 707/2 |
| 6,421,661 B1 | 7/2002 | Doan et al. | |
| 6,546,402 B1 * | 4/2003 | Beyer et al. | 707/201 |
| 6,581,063 B1 | 6/2003 | Kirkman | |
| 6,704,885 B1 * | 3/2004 | Salas-Meza et al. | 714/6 |
| 6,711,122 B1 * | 3/2004 | Langley et al. | 370/205 |
| 2002/0174049 A1 * | 11/2002 | Kitahara | 705/36 |
| 2003/0221162 A1 * | 11/2003 | Sridhar | 715/501.1 |
| 2003/0225620 A1 * | 12/2003 | Nelson et al. | 705/14 |
| 2009/0055512 A1 * | 2/2009 | Hodson et al. | 709/219 |

OTHER PUBLICATIONS

MySQL Administrator's Guide by MySQL AB, Jul. 26, 2004, Retrieved from the Internet:<URL: (http://proquest.safaribooksonline.com/0672326345/ch04lev1sec6>.*
Headington et al., "Data Abstraction and Structures Using C++", by Mark R. Headington and David D. Riley, published in 1994.*
Mansfield Jr. et al., "An Introduction to Programming Using C++", by Kenneth C. Mansfield Jr. and James L. Antonakos, published in 1997.*
MySQL Administrator's Guide by MySQL AB (Jul. 26, 2004) (http://proquest.safaribooksonline.com/0672326345/ch04lev1sec6.

* cited by examiner

*Primary Examiner* — Robert Stevens
*Assistant Examiner* — Dennis Myint
(74) *Attorney, Agent, or Firm* — Sughrue Mion, PLLC.

(57) ABSTRACT

There is disclosed a data processing system implemented method, a data processing system, and an article of manufacture for directing a data processing system to maintain a database table associated with an initial maintenance scheduling interval. The data processing system implemented method includes selecting a randomizing factor, and selecting a new maintenance scheduling interval for the database table based on the initial maintenance scheduling interval and the selected randomizing factor.

23 Claims, 6 Drawing Sheets

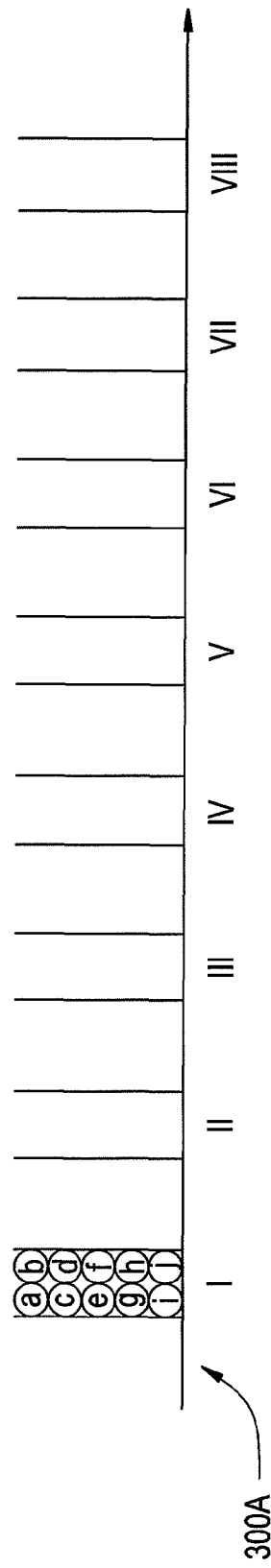
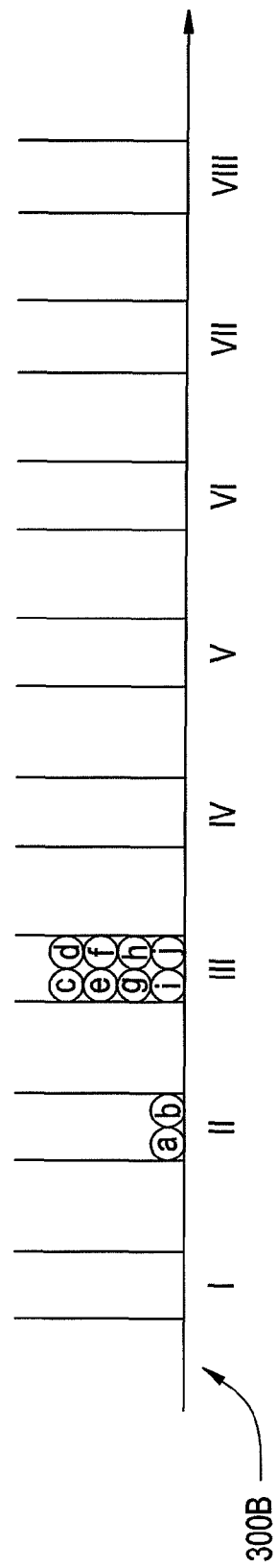
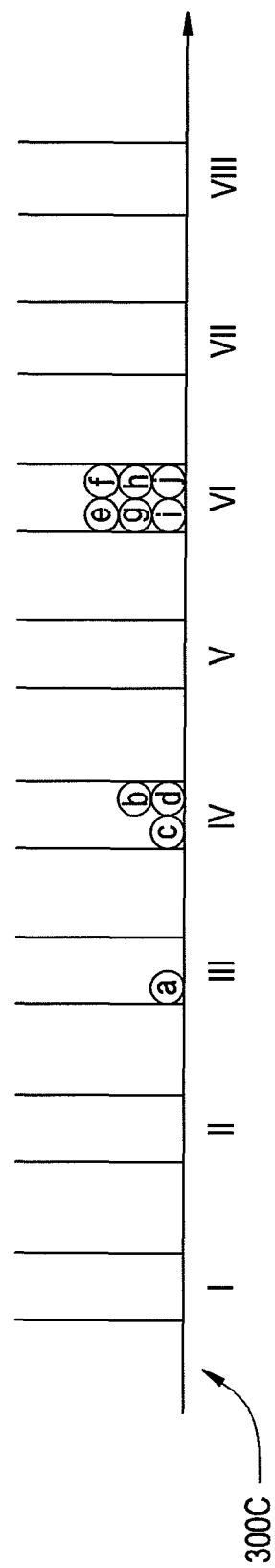

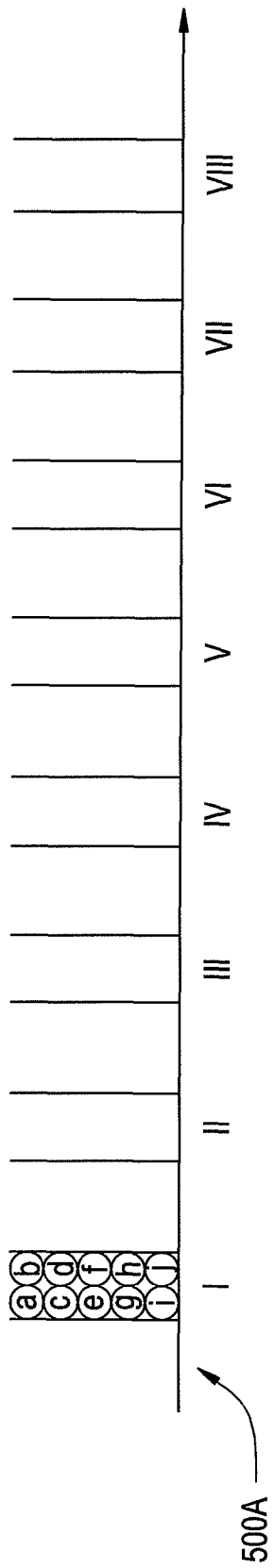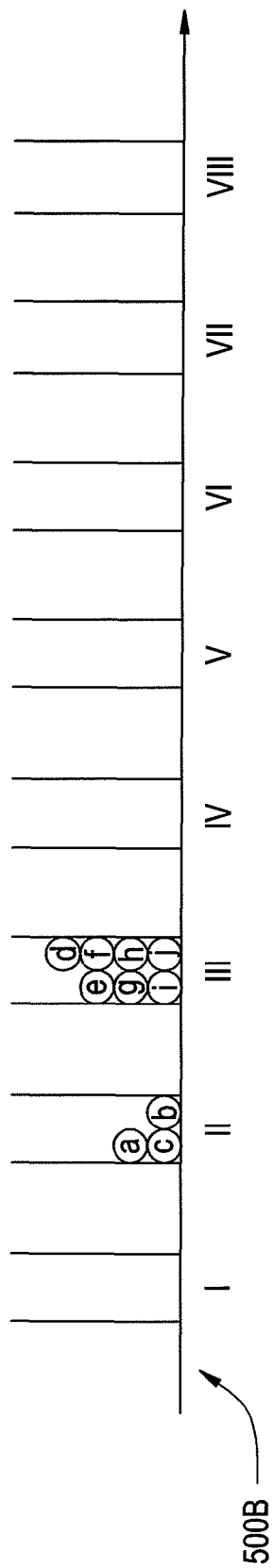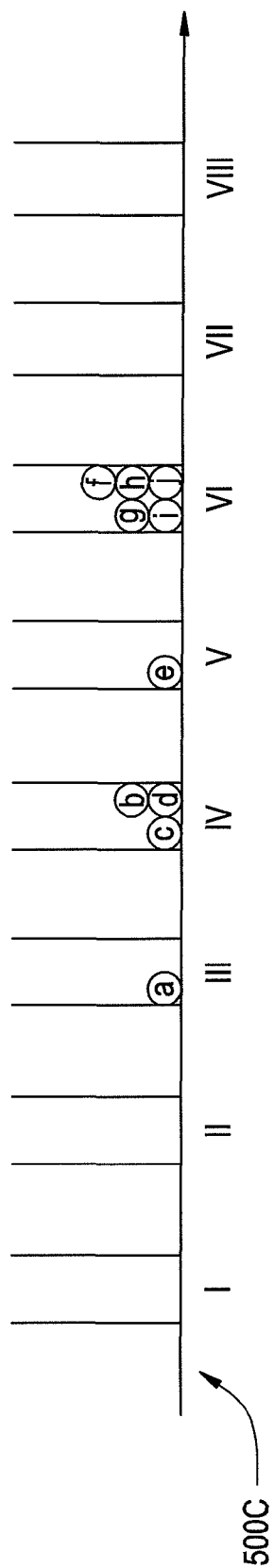

METHOD, SYSTEM AND PROGRAM FOR PRIORITIZING MAINTENANCE OF DATABASE TABLES

This is a continuation of pending U.S. application Ser. No. 11/016,233 filed Dec. 17, 2004, the disclosure of which is being hereby incorporated by reference in its entirety.

BACKGROUND

The present invention relates to database management systems generally, and more particularly the present invention relates to a method, a data processing system and an article of manufacture for prioritizing maintenance of database tables.

Modern database schemas can be very large and complex, with a database management system ("DBMS") managing perhaps tens, hundreds, or even thousands of tables. The tables may contain tens or hundreds of columns each and millions of records collectively. As known to those skilled in the art, it is necessary regularly to perform maintenance tasks on the database tables to achieve satisfactory database performance over an extended period of time.

Consider a specific example. Many modern databases use a standardized query language known as Structured Query Language ("SQL"). With SQL, a user is able to specify a database query using declarative language, leaving it up to the DBMS to figure out how to best access and join tables in the database in order to extract matching records.

For any given SQL query, there may be numerous ways in which tables may be joined and accessed to obtain the requested data. Many modern DBMS products include query optimizers to evaluate alternative query execution plans ("QEPs") and to select one that is suitable. Evaluating many possible QEPs may involve estimating costs (i.e. resources consumed) for each possible QEP based on mathematical models. These mathematical models typically require input from various statistics collected for each database table.

Thus, for the purposes of obtaining cost estimates for alternative QEPs, it is desirable to perform table statistics collection regularly so that the table statistics are up-to-date. Otherwise, the cost estimates for QEPs may be inaccurate, and may lead to reduced database query performance.

In addition to maintenance tasks involving the collection of up-to-date table statistics, various other table maintenance tasks may also be required, such as backup, recovery, reorganizing of records, log file maintenance, and so on.

While it may be desirable to be able to perform these various table maintenance tasks at any time, and as often as required, this is often not possible. More typically, service level agreements or other database performance considerations may impose significant restrictions on when table maintenance may be performed. Thus, a limited window of opportunity for performing various maintenance tasks may be made available from time to time (e.g. overnight or during off-peak hours). For maintenance scheduling purposes, a continuous series of these maintenance windows must be considered, since a maintenance task that is not scheduled in a current maintenance window may need to be rescheduled for a future maintenance window. (In the context of the current discussion, the table maintenance tasks performed during a maintenance window is referred to as a maintenance "iteration".)

For a database schema with a relatively modest number of tables, it may be possible for a human database administrator to analyze the maintenance requirements for each table, and manually schedule the maintenance tasks in upcoming maintenance iterations. However, as the number of tables increases, manual scheduling may quickly become impractical, if not impossible.

There are some known techniques and tools for autonomically scheduling maintenance for databases. However, these known techniques tend to exhibit certain limitations, such as a tendency to schedule maintenance unevenly over available maintenance windows, or to make changes in scheduling which may not be suitable. Over time, such limitations may lead to degradation of database performance due to less than optimal maintenance.

What is needed is an improved technique for scheduling and prioritizing maintenance for a plurality of database tables.

SUMMARY

In an aspect of the present invention, there is provided a data processing system implemented method for directing a data processing system to maintain a given database table associated with an initial maintenance scheduling interval, the data processing system implemented method including: selecting a randomizing factor; and selecting a new maintenance scheduling interval for the given database table based on the initial maintenance scheduling interval and the selected randomizing factor.

In another aspect of the invention, there is provided a data processing system for maintaining a given database table associated with an initial maintenance scheduling interval, the data processing system including: a selecting module for selecting a randomizing factor; and a selection module for selecting a new maintenance scheduling interval for the given database table based on the initial maintenance scheduling interval and the selected randomizing factor.

In yet another aspect of the invention, there is provided an article of manufacture for directing a data processing system to maintain a given database table associated with an initial maintenance scheduling interval, the article of manufacture including: a program usable medium embodying one or more instructions executable by the data processing system, the one or more instructions including: data processing system executable instructions for selecting a randomizing factor; and data processing system executable instructions for selecting a new maintenance scheduling interval for the given database table based on the initial maintenance scheduling interval and the selected randomizing factor.

Advantageously, the resulting schedule better balances the maintenance scheduling requirements for a plurality of database tables, in a manner that may help to maintain database performance over an extended period.

These and other aspects of the invention will become apparent from the following more particular descriptions of exemplary embodiments of the invention.

BRIEF DESCRIPTION OF THE DRAWINGS

In the figures which illustrate exemplary embodiments of the invention:

FIGS. 3A-3C is a schematic diagram showing consecutive iterations of a maintenance scheduling technique;

FIGS. 5A-5C is a schematic diagram showing a maintenance scheduling technique in accordance with an illustrative embodiment of the invention;

DETAILED DESCRIPTION

Figure 1:
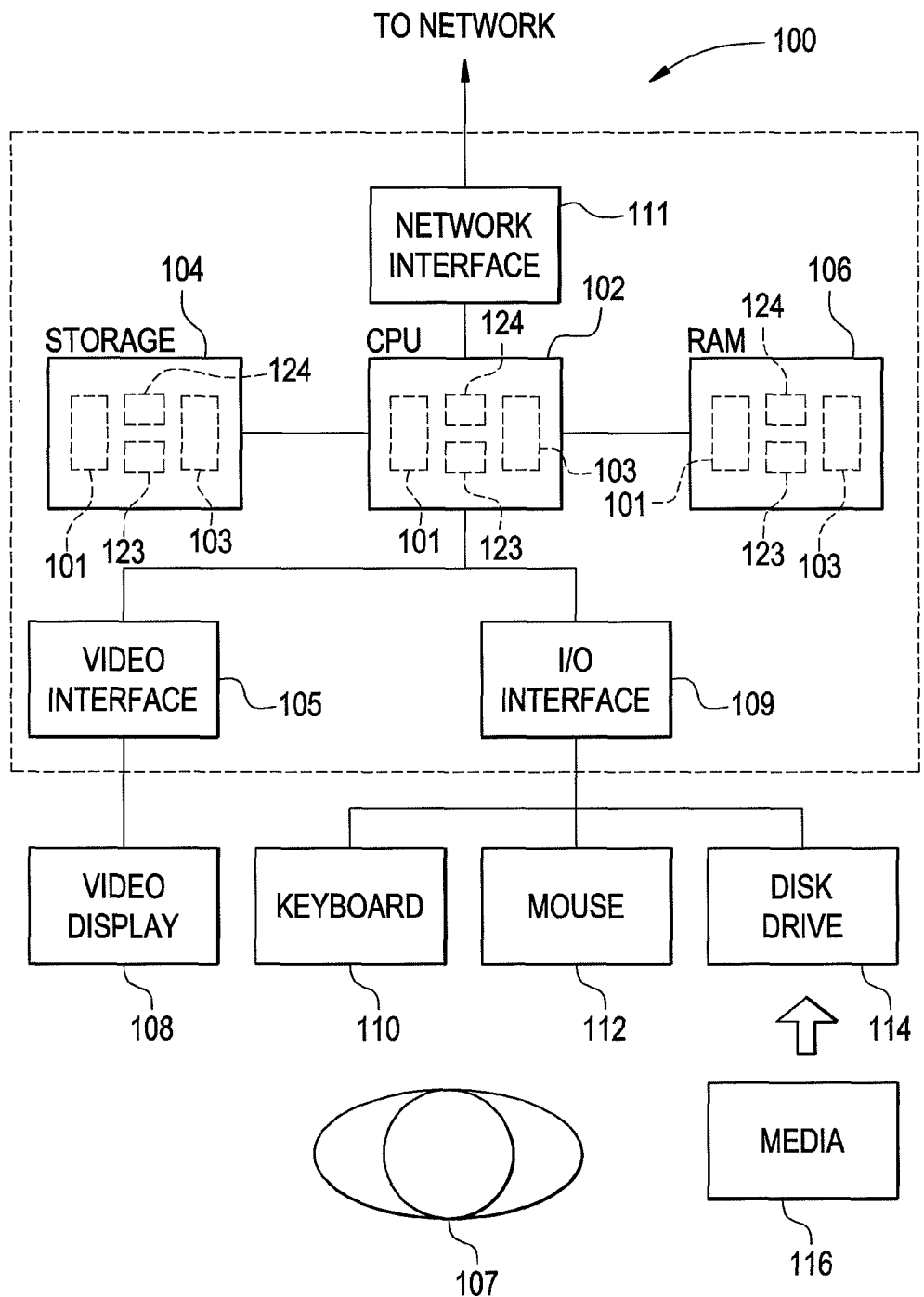
FIG. 1 is a schematic block diagram of a data processing system which may provide an operating environment for practicing exemplary embodiments of the invention.

FIG. 1 shows a schematic block diagram of a data processing system which may provide an operating environment for practicing exemplary embodiments of the invention. The data processing system 100 may include a central processing unit ("CPU") 102 connected to a storage unit 104 and to a random access memory ("RAM") 106. The CPU 102 may process an operating system 101, a database management system ("DBMS") 103, a database 123 including a plurality of database tables managed by the DBMS, and a program 124 with one or more instructions executable by the data processing system 100 embodying the invention as described further below.

The operating system 101, database 123, program 124, and DBMS 103 may be stored in the storage unit 104 and loaded into RAM 106, as required. A user 107 may interact with the data processing system 100 using a video display 108 connected by a video interface 105, and various input/output devices such as a keyboard 110, mouse 112, and disk drive 114 connected by an I/O interface 109. The disk drive 114 may be configured to accept an article of manufacture comprising a computer-readable medium 116 including RAM, ROM, flash memory; optical media; magnetic media; and other well-known computer-readable storage media. The data processing system 100 may be network enabled via a network interface 111, allowing the data processing system 100 to communicate with other compatible data processing systems across a network (not shown).

As an illustrative example, the DBMS 103 may be IBM DB2™ configured to manage database 123. Database 123 may include numerous tables storing data accessible by SQL.

The data processing system 100 in FIG. 1 is merely illustrative, and is not meant to be limiting in terms of the type of system which may provide a suitable operating environment for practicing the present invention. For example, the DBMS 103 and database 123 may operate within a client-server computing environment over the network, rather than on a single data processing system 100 as shown.

Figure 2:
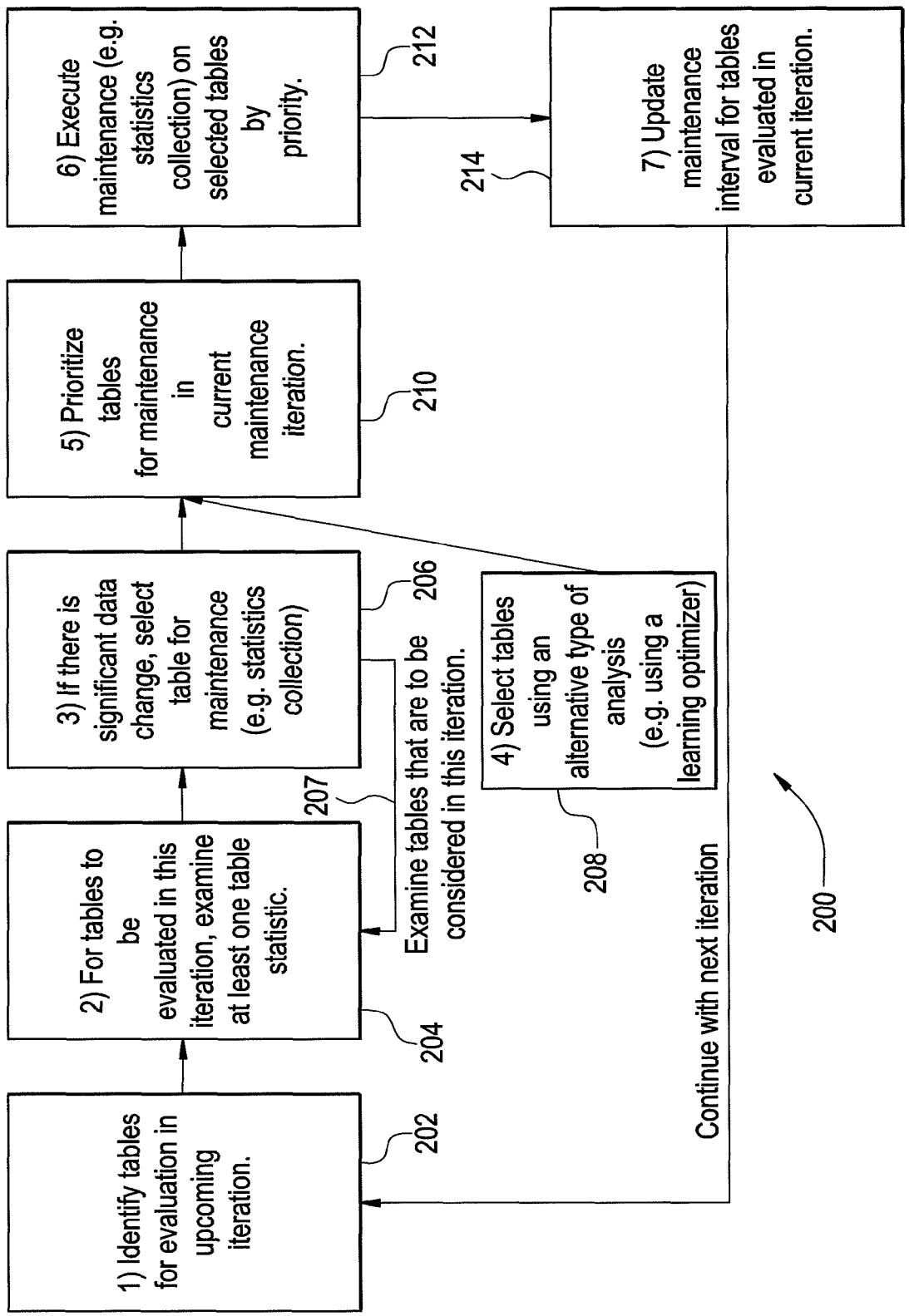
FIG. 2 shows a block flow diagram of an illustrative process for identifying, evaluating, and prioritizing tables.

Referring to FIG. 2, there is shown a simplified block flow diagram of an illustrative method 200 for scheduling maintenance for tables. As shown, method 200 is represented as a continuous loop of interconnected blocks 202-214. In an embodiment, method 200 may be embodied as a process running on data processing system 100 in conjunction with DBMS 103 of FIG. 1. The loop of method 200 is traversed once for each maintenance "iteration", in which a group of tables in a database are scheduled for maintenance. Method 200 may be briefly summarized as follows:

As shown at block 202, a number of database tables are first identified for evaluation in an upcoming maintenance iteration. In an embodiment, except in the very first iteration, data (which includes the iteration for the next maintenance of this table) generated on previous iterations is used. In the very first iteration of method 200, all tables in the database may be identified at block 202 for evaluation. However, in subsequent iterations, only certain tables are identified for evaluation from the previous maintenance iteration. This acknowledges the fact that it would be prohibitively expensive to evaluate all tables in a database at each upcoming iteration.

At block 204, for each table identified at block 202, various table statistics are examined. For example, in DB2, update-delete-insert (UDI) counts and table size may be examined, as provided in the DB2 kernel.

At block 206, a type of analysis known as "data change" analysis may be performed based on examination of table statistics at block 204. In particular, if there are significant changes to data in a table since the last maintenance iteration (e.g. in terms of UDI counts or table size), the table may be selected for maintenance (i.e. updated statistics collection at block 212, described below). If the changes are not significant, a table may not be selected for maintenance.

In FIG. 2, arrow 207 indicates that examination of statistics at block 204 and data change analysis at block 206 may be performed repeatedly for each table identified earlier for evaluation at block 202. After data change analysis is completed for each table identified at block 202, the number of tables remaining for maintenance (i.e. statistics collection) may be less than the number of tables first identified at block 202. From block 206, method 200 proceeds to block 210, where tables selected for maintenance (statistics collection) are ranked, as described further below.

There may be more than one way to select tables for prioritization at block 210. By way of example, in addition to selecting tables using data change analysis at block 206, tables may also be identified for evaluation by using another type of analysis using an autonomic "learning optimizer" at block 208. One such learning optimizer is DB2's LEO (LEarning Optimizer) product, which operates as a query optimizer that is able to compare an estimated performance cost for a QEP with an actual performance cost observed when the query is executed. Based on this statistic of a comparison of estimated to actual costs, LEO may modify, if necessary, future cost estimates for similar QEPs, or recommend the collection of statistics on some database tables. For further details on LEO, the reader is directed to Markl, V., and Lohman, G., "Learning Table Access Cardinalities with LEO," Proceedings of the ACM SIGMOD Conference, Madison, Wis., 2002, which is incorporated by reference herein in its entirety. Also, the reader is directed to Stillger, M., Lohman, G, Markl, V., and Kandil, M., "LEO-DB2's LEarning Optimizer," VLDB Conference 2001, pp. 19-28, which is incorporated by reference herein in its entirety.

In the disclosed example, a table may be selected for statistics update collection at block 206, at block 208, at neither block, or at both blocks. As will be explained, the way in which a table is selected at one of or both blocks 206 and 208 may be used to prioritize the table for maintenance within a maintenance iteration.

Certain tables having occasional but large step-wise growth may pose a particular challenge. Such tables are difficult to effectively prioritize for evaluation as the sudden change in size may not be anticipated for scheduling purposes. To address this problem, operations that are known to cause these large step changes may be identified as special cases. For example, in DB2, operations such as LOAD, IMPORT and REPLICATION may be identified as causing large step-wise changes, such that whenever these operations are performed on one or more tables, the affected tables are flagged and identified for evaluation. These flagged and identified tables may then have their ranking increased (e.g. at block 210), so that statistics collection for the flagged tables can be performed more quickly.

At block 210, tables may be prioritized for maintenance (e.g. statistics collection) in the current maintenance iteration. As statistics collection for a table can be very time consuming, it is of value to prioritize the sequence of the statistics collection, in case some of the statistics collection cannot be completed in the current iteration. By prioritizing the tables, the more important statistics are collected first, so that any adverse effect of not updating the statistics may be minimized.

At block 212, table maintenance (e.g. statistics collection) is performed according to the priorities determined at block 210. For example, in IBM DB2, the RUNSTATS process may be used for this purpose. In order to provide some continued capacity for regular database operations, however, appropriate throttling and lock contention avoidance may be implemented when running the DB2 RUNSTATS process.

After table maintenance (e.g. statistics collection) has been performed at block 212, maintenance schedules for tables examined in the current iteration are updated at block 214.

In an embodiment, table statistics may be examined to determine whether the amount of data change exceeds a predetermined upper threshold, falls below a predetermined lower threshold, or falls somewhere in between the upper and lower thresholds. If the amount of data change exceeds a certain upper threshold, then the frequency of maintenance may be suitably increased (i.e. the maintenance interval may be suitably decreased). If the amount of data change falls below a certain lower threshold, then the frequency of maintenance may be suitably decreased (i.e. the maintenance interval may be suitably increased). If the amount of data change falls somewhere in between the upper and lower thresholds, then the frequency of maintenance (and the maintenance interval) may stay the same.

The amount of data change of a table is one possible table statistic that may be analyzed. However, it will be appreciated that other table statistics indicative of a requirement for adjustment of the maintenance interval may also be used.

In an embodiment, a system wide interval factor may be used for the purposes of adjusting table maintenance scheduling. As an illustrative example, the system wide interval factor may be two. Using this system wide factor, a possible range for a new maintenance schedule interval may be defined as extending from the initial maintenance interval to twice the initial maintenance interval. (While an interval factor of two has been selected for this illustrative example, it will be appreciated that another suitable interval factor could also be used.)

FIGS. 3A-3C illustrate a maintenance scheduling example in which a group of tables are scheduled for maintenance over three consecutive iterations. Initially, as shown at FIG. 3A, all tables are grouped together and scheduled in iteration I for maintenance.

During the next iteration at FIG. 3B, the tables are split across two different iterations: tables a and b from iteration I are scheduled in iteration II, and tables c-j from iteration I are scheduled in iteration III. Thus, in iteration II, maintenance is performed on tables a and b, while tables c-j are considered to be less important so that these tables c-j can skip one maintenance iteration.

In the following iteration, at FIG. 3C, table a from iteration II is scheduled in iteration III, indicating that table a is important enough to schedule again immediately in the next maintenance iteration. However, table b has become less important, so that it can now skip a maintenance iteration and be scheduled for iteration IV. Similarly, table c has become more important, so that it is now scheduled for the next maintenance iteration without skipping an iteration as before.

As for tables e-j, assume that these tables are even less important than previously thought, so that instead of skipping every other maintenance iteration, tables e-j may now skip two maintenance iterations before being scheduled again.

As illustrated in FIG. 3C, after two scheduling steps, the tables a-j have been scheduled relatively unevenly, with six tables in iteration VII, and an empty iteration V.

In accordance with an embodiment of the invention, in order to provide a more balanced schedule over the available maintenance windows, a randomizing factor may be used to select a random value within a defined range to determine a new scheduling interval for that table.

In an embodiment, the randomizing factor is a skew function. By way of example, a skew function similar to the function shown in FIG. 4 may be used. As will be apparent from FIG. 4, the skew function is more likely to produce random numbers close to 2*I than to I (where I is a previous maintenance interval for the table—or the number of maintenance iterations to skip before the next scheduled maintenance).

Based on evaluation of various table statistics (as discussed above), and given a system wide interval factor (as discussed above), a new maintenance schedule may be calculated at block 214. More specifically, when increasing a maintenance interval (i.e. a table is scheduled for maintenance less often), instead of defining the new interval to be simply twice as much as I (i.e. 2*I), the new interval may be randomly selected to be within a range falling between I and 2*I. However, the probability of being closer to I is low, while the probability of being closer to 2*I is high. Thus, on average, the new interval for table maintenance will be closer to twice as much as the previous interval than to the previous interval. If the randomly selected value is not an integer, it may be rounded to the nearest integer value for the purposes of selecting a maintenance interval.

Figure 4:
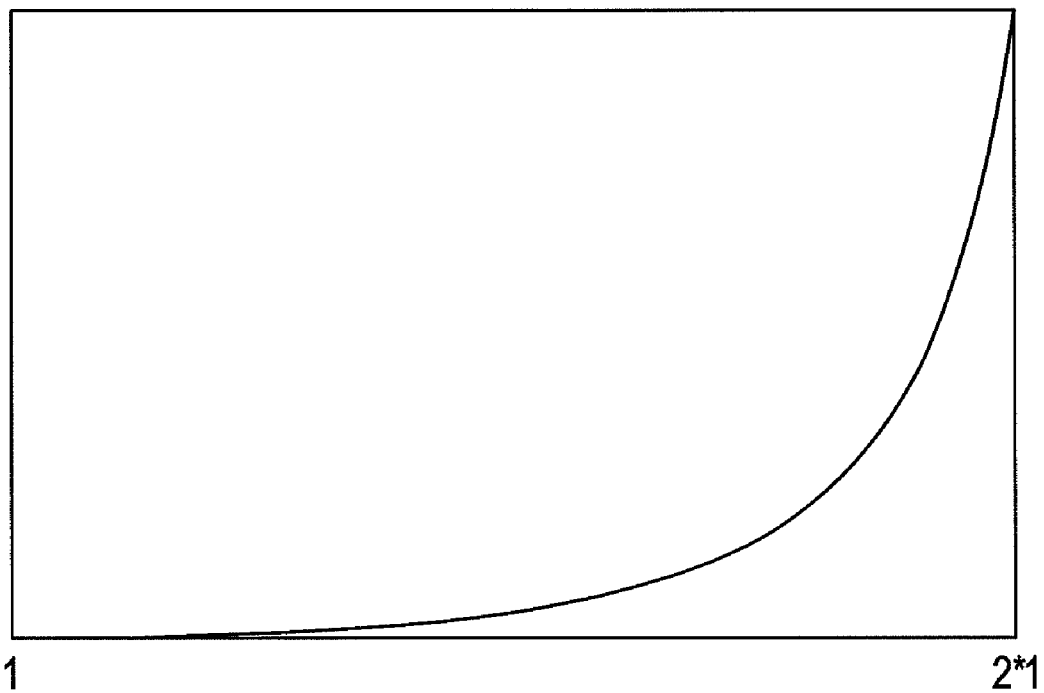
FIG. 4 is an xy graph of a skew function which may be used in defining a maintenance interval in accordance with an embodiment of the invention.

The effect of using the skew function in FIG. 4 on table maintenance scheduling is illustrated by way of example in FIGS. 5A-5C (compare to FIGS. 3A-3C, above). As shown, the ten tables a-j originally found in iteration I of FIG. 5A (also in iteration I of FIG. 3A) are scheduled into iteration II and iteration III during the next iteration in FIG. 5B. However, based on a random selection of the new interval using the skew function in FIG. 4, at least one table (table c) which would otherwise have been scheduled for iteration III (as shown in FIG. 3B) is now scheduled instead in iteration II.

Similarly, using the skew function in FIG. 4, tables a-c in iteration II of FIG. 5B are scheduled for iteration III (table a) and iteration IV (tables b and c) of FIG. 5C. Table d from iteration III of FIG. 5B is scheduled for iteration IV of FIG. 5C. Table e from iteration III of FIG. 5B is now scheduled in iteration V of FIG. 5C, and the remainder of tables f-j in iteration III of FIG. 5B are scheduled in iteration VI of FIG. 5C. As will be apparent, by using the skew function of FIG. 4, the maintenance schedule for the tables is spread out more evenly in comparison to the maintenance schedule shown in FIGS. 3A-3C.

Figure 6:
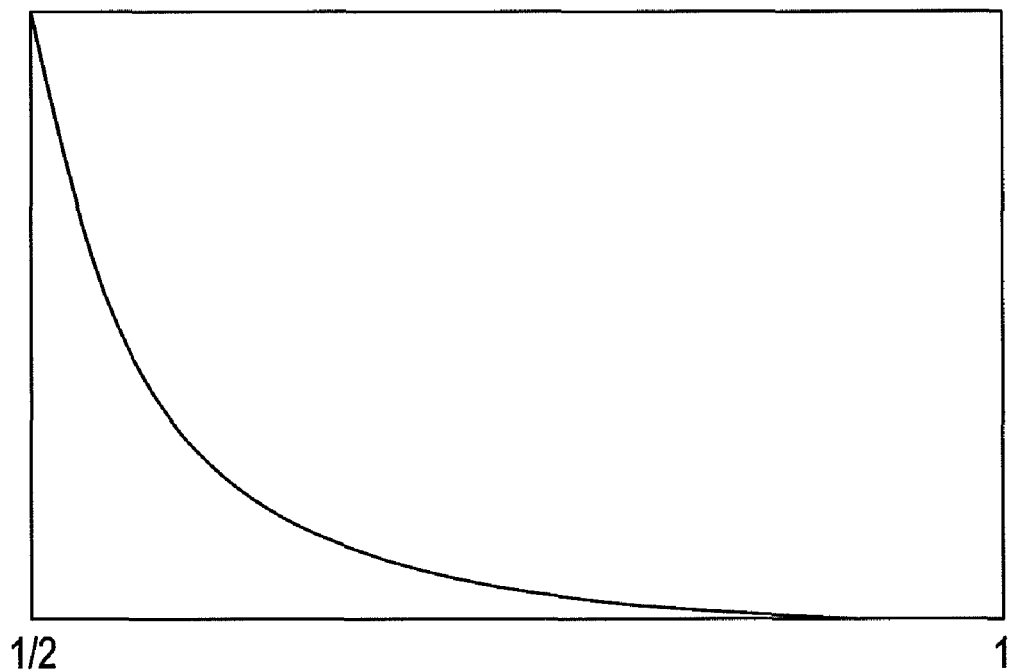
FIG. 6 is an xy graph of a skew function mirroring the skew function of FIG. 4, which may be used in defining a maintenance interval in accordance with an embodiment of the invention.

If an interval between maintenance operations for a table is to be reduced rather than increased, the previous interval I may be divided by (rather than multiplied by) the system wide interval factor of two. Thus, for example, if a previous maintenance interval for a table is once every four iterations, dividing the interval by two would cause the table to be scheduled for every second iteration. If a constant divisor is used, however, the uneven scheduling problem previously described may occur again. To avoid this problem, again a randomizing factor may be used. Again, the randomizing factor may be a skew function. However, in this case, the randomizing factor may be a "mirror" of the skew function of FIG. 4, as illustrated by way of example in FIG. 6. As shown, the function shown in FIG. 6 is weighted such that the probability of a reduced interval closer to ½I is high, while the probability of a reduced interval closer to I is low. Again, as the selection of the reduced maintenance interval is randomized within this range (rounded to the nearest integer), the resulting table maintenance schedule will be more evenly distributed. Unlike the case where an increased interval I can be increased virtually without limit, it will be appreciated that the reduced interval I cannot be below one (i.e. scheduled for maintenance during every interval).

Once the tables have been scheduled for maintenance within a particular iteration as described above, the tables may undergo further prioritization within the particular iteration by priority class. By way of example, if a table has been selected using more than one type of analysis, this fact may be used to assign to the table a higher priority within the particular iteration. Alternatively, a table selected using one type of analysis may be assigned a higher rank than a table selected using another type of analysis.

In an illustrative embodiment, the defined priority classes may be as follows:

| Priority class | Priority class definition | Rank within priority class |
| --- | --- | --- |
| A0 | Starvation avoidance. Tables that were identified in lower priority classes but failed to have statistics collected due to other tables having higher precedence and the iterations eventually timeout. | Ordered first by DB2's LEO execution count (frequency of use in the workload) and then by % change. |
| AL | Tables selected by both the data change analysis and the LEO analysis. | Ordered first by DB2's LEO execution count (frequency of use in the workload) and then by % change. |
| A1 | Tables selected by the data change analysis showing large data changes (>50%) or tables having no statistics at all. | Ordered by % change |
| L | Tables identified by LEO | Ordered by DB2's LEO execution count (frequency of use in the workload) |
| A2 | Tables identified by the data change analysis showing moderate changes (10-50%) | Ordered by % change |

As shown by way of illustration, the highest priority class "A0" is assigned to any table that has been identified as being "starved" of maintenance, such that the table is beginning to significantly affect database performance. This may occur, for example, if maintenance for a table having a relatively low priority is perpetually delayed due to tables with higher priority jumping the queue. At a certain critical point, regardless of the lower priority previously assigned to the table, maintenance may be performed on the table such that the risk of maintenance starvation is reduced. Thus, priority class A0 will enforce a maximum age for statistics in tables.

The next highest priority class "AL" is assigned tables that have been selected by two different types of analysis (e.g. selected at both block 206 and block 208), the assumption being that these tables are more likely to require maintenance than other tables that have been selected by only one type of analysis.

Continuing, the next highest priority class "A1" is assigned to tables that have been selected using data change analysis only (e.g. selected at block 206), with a large data change of over 50%. The next highest priority class "L" is assigned to tables that have been identified using a learning optimizer only (e.g. selected at block 208).

Finally, priority class "A2" is assigned to tables that have been selected using data change analysis only (e.g. selected at block 206), but having a smaller amount of data change of 10-50%.

It will be apparent from the foregoing that, for a given table, the statistics used to evaluate when the table will next be scheduled, and its priority for maintenance in an interval during which it is scheduled, will be the most recent statistics available for the table. For a table not recently maintained, these statistics will be somewhat out-of-date.

As illustrated by the above example, various schemes for prioritizing tables may be used. Prioritizing tables for maintenance within an iteration based on the priority classes may determine whether or not maintenance scheduled for a table will actually be performed.

While various illustrative embodiments of the invention have been described above, it will be appreciated by those skilled in the art that variations and modifications may be made. Thus, the scope of the invention is defined by the following claims.

What is claimed is:

1. A data processing system implemented method for directing a data processing system to maintain a database table associated with an initial maintenance scheduling interval, the data processing system implemented method comprising:
   selecting a randomizing factor;
   selecting a random value based on the randomizing factor;
   selecting a new maintenance scheduling interval for the database table based on a mathematical operation between the initial maintenance scheduling interval and the selected random value; and
   maintaining the database table based on the new maintenance scheduling interval;
   wherein the randomizing factor is used to select the random value in a range; and
   wherein the initial maintenance scheduling interval corresponds to a first frequency of performing maintenance operations on the database table, and the new maintenance scheduling interval corresponds to a second frequency of performing maintenance operations on the database table determined based on the first frequency of performing maintenance operations on the database table.

2. The data processing system implemented method of claim 1 wherein the database table is associated with a table statistic, the method further comprising:
   evaluating, using the table statistic, a requirement for adjusting the initial maintenance scheduling interval.

3. The data processing system implemented method of claim 1 wherein the randomizing factor includes a selection of the new maintenance scheduling interval within a range, a first end of the range being at the initial maintenance scheduling interval.

4. The data processing system implemented method of claim 1 further comprising scheduling maintenance for the database table using the new maintenance scheduling interval.

5. The data processing system implemented method of claim 4 further comprising:
   scheduling database table maintenance within a plurality of maintenance iterations;
   and ranking tables for scheduling within each maintenance iteration by priority class.

6. The data processing system implemented method of claim 5 wherein the ranking by priority class is based on at least one of data change analysis and analysis performed by a learning optimizer.

7. The data processing system implemented method of claim 6 wherein the ranking by priority class is higher when recommended by more than one type of analysis.

8. The method of claim 1, wherein the initial maintenance scheduling interval is multiplied by the selected random value.

9. The method of claim 1, wherein the initial maintenance scheduling interval is divided by the selected random value.

10. A data processing system for maintaining a database table associated with an initial maintenance scheduling interval, the data processing system comprising:
  a computer-implemented randomizing factor selecting module which selects a randomizing factor;
  a computer-implemented random value selecting module which selects a random value based on the selected randomizing factor;
  a computer-implemented maintenance scheduling interval selection module which selects a new maintenance scheduling interval for the database table based on a mathematical operation between the initial maintenance scheduling interval and the selected random value; and
  a computer-implemented maintenance module which maintains the database table based on the new maintenance scheduling interval;
  wherein the randomizing factor is used to select the random value in a range, and
  wherein the initial maintenance scheduling interval corresponds to a first frequency of performing maintenance operations on the database table, and the new maintenance scheduling interval corresponds to a second frequency of performing maintenance operations on the database table determined based on the first frequency of performing maintenance operations on the database table.

11. The data processing system of claim 10 wherein the database table is associated with a table statistic, the data processing system further comprising:
  an evaluating module for evaluating, using the table statistic, a requirement for adjusting the initial maintenance scheduling interval.

12. The data processing system of claim 10 wherein the randomizing factor includes a selection of the new maintenance scheduling interval within a range, a first end of the range being at the initial maintenance scheduling interval.

13. The data processing system of claim 10 further comprising a scheduling module for scheduling maintenance for the database table using the new maintenance scheduling interval.

14. The data processing system of claim 13 further comprising:
  a scheduling module for scheduling database table maintenance within a plurality of maintenance iterations; and
  a ranking module for ranking tables for scheduling within each maintenance iteration by priority class.

15. The data processing system of claim 14 wherein the ranking by priority class is based on at least one of data change analysis and analysis performed by a learning optimizer.

16. The data processing system of claim 15 wherein the ranking by priority class is higher when recommended by more than one type of analysis.

17. An article of manufacture for directing a data processing system to maintain a database table associated with an initial maintenance scheduling interval, the article of manufacture comprising:
  a computer readable medium embodying one or more instructions executable by the data processing system, the one or more instructions comprising:
  data processing system executable instructions for selecting a randomizing factor;
  data processing system executable instructions for selecting a random value based on the randomizing factor;
  data processing system executable instructions for selecting a new maintenance scheduling interval for the database table based on a mathematical operation between the initial maintenance scheduling interval and the selected random value; and
  data processing system executable instructions for maintaining the database table based on the new maintenance scheduling interval;
  wherein the randomizing factor is used to select the random value in a range, and
  wherein the initial maintenance scheduling interval corresponds to a first frequency of performing maintenance operations on the database table, and the new maintenance scheduling interval corresponds to a second frequency of performing maintenance operations on the database table determined based on the first frequency of performing maintenance operations on the database table.

18. The article of manufacture of claim 17 wherein the database table is associated with a table statistic, the article of manufacture further comprising:
  data processing system executable instructions for evaluating, using the table statistic, a requirement for adjusting the initial maintenance scheduling interval.

19. The article of manufacture of claim 17 wherein the randomizing factor includes a selection of the new maintenance scheduling interval within a range, a first end of the range being at the initial maintenance scheduling interval.

20. The article of manufacture of claim 17 further comprising data processing system executable instructions for scheduling maintenance for the database table using the new maintenance scheduling interval.

21. The article of manufacture of claim 20 further comprising:
  data processing system executable instructions for scheduling database table maintenance within a plurality of maintenance iterations; and
  data processing system executable instructions for ranking tables for scheduling within each maintenance iteration by priority class.

22. The article of manufacture of claim 21 wherein the ranking by priority class is based on at least one of data change analysis and analysis performed by a learning optimizer.

23. The article of manufacture of claim 22 wherein the ranking by priority class is higher when recommended by more than one type of analysis.

* * * * *